April 18, 1933.  L. W. COOK  1,904,677
PREPARATION OF CHLORHYDRINS
Filed Sept. 25, 1928
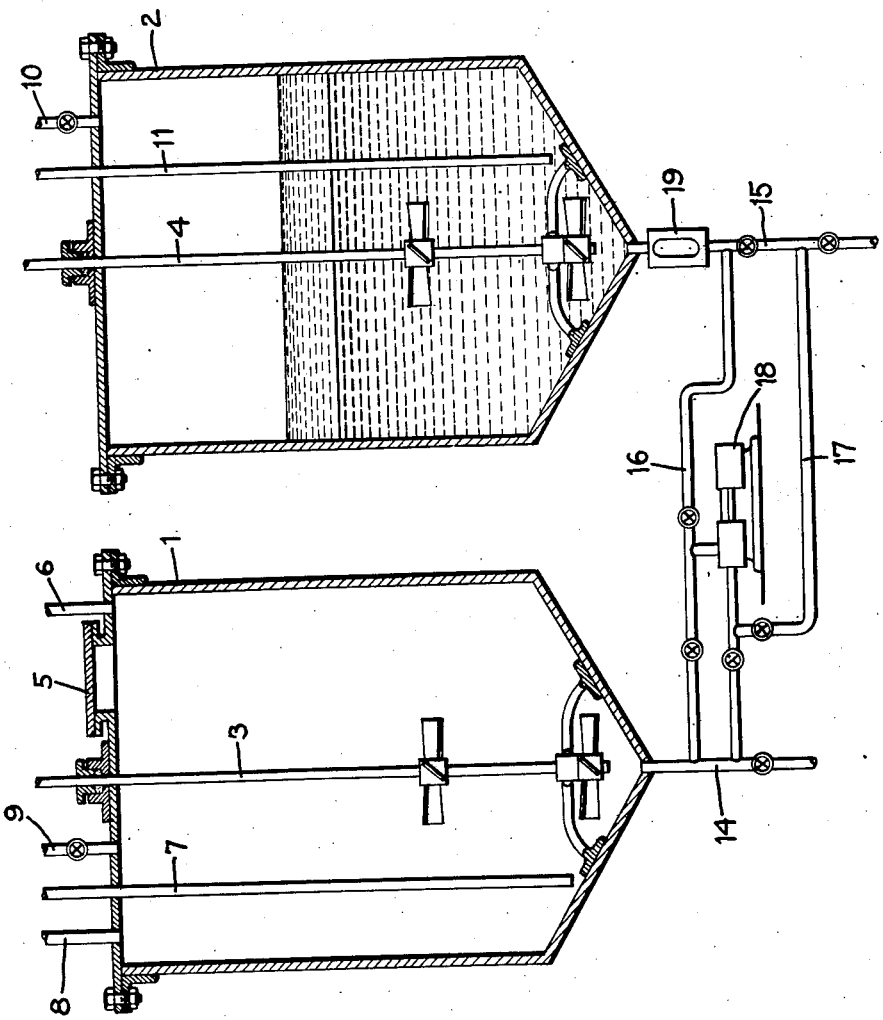
Inventor
Leon W. Cook.
By his Attorney
R. J. Dearborn Patented Apr. 18, 1933

1,904,677

UNITED STATES PATENT OFFICE

LEON W. COOK, OF ROSELLE, NEW JERSEY, ASSIGNOR TO THE TEXAS COMPANY, OF NEW YORK, N. Y., A CORPORATION OF DELAWARE

PREPARATION OF CHLORHYDRINS

Application filed September 25, 1928. Serial No. 308,332.

This invention relates to a method of preparing chlorhydrins and especially relates to a method of preparing chlorhydrins of liquid olefines.

The preparation of chlorhydrins of liquid olefines presents considerable difficulty since these hydrocarbons are so reactive that there is a strong tendency to produce side reactions and especially if any free chlorine be permitted to come into contact with the olefine to produce dichlor paraffins.

In order to avoid the formation of dichlor paraffins the hypochlorous acid solution is carefully prepared so that it will be free from chlorine and of low concentration, preferably not exceeding 0.75%. However, a very large quantity of such weak solution would be required to convert a given quantity of olefine to chlorhydrin. I have discovered that substantially complete conversion of the olefine to chlorhydrin can be made by treating the olefine with a solution of hypochlorous acid with agitation and after the latter has become exhausted, separating it from the liquid olefine containing dissolved reaction products and regenerating the hypochlorous acid solution to the desired strength. It may then be contacted again with the olefine, forming additional chlorhydrin, and this process may be repeated until the desired conversion is accomplished. Although any desired proportion of olefine to hypochlorous acid solution may be used, it has been found desirable to employ from 5 to 10 volumes of water solution of the acid to 1 volume of the olefine.

In carrying out the process, the hydrocarbon, for example, octylene may continuously be converted into the corresponding chlorhydrin by thoroughly agitating it with about five times its volume of a water solution of hypochlorous acid which has been prepared by the introduction of chlorine gas into a solution of sodium bicarbonate until the hypochlorous acid strength has reached about 0.75%. The solution is preferably kept cold by suitable refrigeration so that side reactions will not occur. After the hypochlorous acid solution has thoroughly reacted with the octylene, it may be separated therefrom and regenerated by the addition of free chlorine gas and sodium bicarbonate, if necessary. By repeated operation in this manner, a large yield of octylene chlorhydrin may be obtained, substantially free from the dichlor compound. The process is particularly applicable to the preparation of chlorhydrins which are relatively insoluble in the hypochlorous acid solution. Such chlorhydrins of liquid olefines have a greater solubility in the liquid olefine layer, and are not present in any material amount in the aqueous hypochlorous acid solution during its period of regeneration, so that they have no opportunity of coming in contact with the free chlorine gas used during the separate regeneration of the hypochlorous acid solution.

Apparatus such as that illustrated, partially in section, in the accompanying drawing may be employed in carrying out the process.

1 and 2 constitute similar vessels provided with stirrers 3 and 4, respectively, for agitating the contents thereof. The vessel 1 may suitably be used as a container for preparing the hypochlorous acid solution and is therefore provided with a manhole 5 through which solid sodium bicarbonate may be introduced. The inlet pipe 6 is provided for introducing water in the vessel 1 and the pipe 7 is adapted for introducing gaseous chlorine. There may also be provided outlet pipe 8 for withdrawing chlorine gas which has not been absorbed in the bicarbonate solution and this gas is preferably recirculated. Each of the vessels may be provided with vent pipes 9 and 10 respectively. The vessel 2 is also provided with an inlet pipe 11 for the introduction of the liquid olefines.

The vessels are connected at the bottom by pipes 14, 15, 16 and 17 and with pump 18 so that liquid may be transferred from one vessel to the other by means of pump 18. Pipes 14 and 15 also serve for draining the vessels 1 and 2. Pipe 15 may also be provided with a look-box 19.

The hypochlorous acid solution is preferably made up in the vessel 1 by the suitable introduction of chlorine gas into a solution of sodium bicarbonate. In the preparation of the solution in this vessel it may be transferred by pump 18 and by the manipulation of suitable valves provided in the apparatus to vessel 2 where with agitation the liquid olefine may be introduced through the pipe 11. After the hypochlorous acid has become exhausted in reaction with the olefine, it may be returned to the vessel 1 by means of the pump 18 and there regenerated by the introduction of further chlorine gas. In withdrawing the exhausted hypochlorous solution from the vessel 2, the line of demarcation between the aqueous liquid and the oil may be observed through look-box 19. The liquid olefine may thus be contacted any desired number of times with hypochlorous acid solution which is regenerated while out of contact with the olefine.

What I claim is:

1. The process of preparing substantially water insoluble chlorhydrins of liquid olefines which comprises alternately contacting the olefines with a weak hyprochlorous acid solution of not more than 0.75% strength and regenerating it to about that strength while out of contact with the liquid olefines and the chlorhydrins so produced, whereby substantially complete conversion into chlorhydrins is obtained without the formation of substantial amounts of dichlor hydrocarbons.

2. The process of treating liquid olefines, whose chlorhydrins are substantially insoluble in water, which comprises contacting the olefines with an aqueous solution of hypochlorous acid of not more than 0.75% strength, separating the exhausted solution from the olefine material and the chlorhydrins so produced, regenerating hypochlorous acid in the solution by supplying thereto free chlorine in the presence of substantially no olefines and chlorhydrins and then further contacting the regenerated solution with the olefine material, whereby the latter is further converted to chlorhydrins without the formation of substantial amounts of polyhalogen compounds.

3. The process of treating liquid olefines, whose chlorhydrins are substantially insoluble in water, which comprises agitating one volume of the olefines with about 5–10 volumes of an aqueous solution of hypochlorous acid containing not in excess of 0.75% of hypochlorous acid, said solution having been prepared by introducing chlorine into aqueous sodium bicarbonate, separating the aqueous solution from the unreacted liquid olefines and dissolved chlorhydrins after the solution has become exhausted by intermittently draining off an aqueous layer substantially free from olefines and chlorhydrins, regenerating the withdrawn solution by addition of free chlorine thereto while maintaining the solution out of contact with the olefines and the chlorhydrins, and then further contacting the regenerated solution with the olefines to produce additional chlorhydrins without the formation of substantial amounts of halogenated by-products.

4. The process of preparing octylene chlorhydrin which comprises alternately contacting octylene with a solution containing not more than 0.75% hypochlorous acid and regenerating the exhausted solution to about that strength while out of contact with the octylene, until substantially complete conversion to chlorhydrin has occurred.

In witness whereof I have hereunto set my hand and seal this 19th day of September, 1928.

LEON W. COOK.